March 22, 1960  J. M. FOLZ  2,929,508
POLYMER SKIMMER

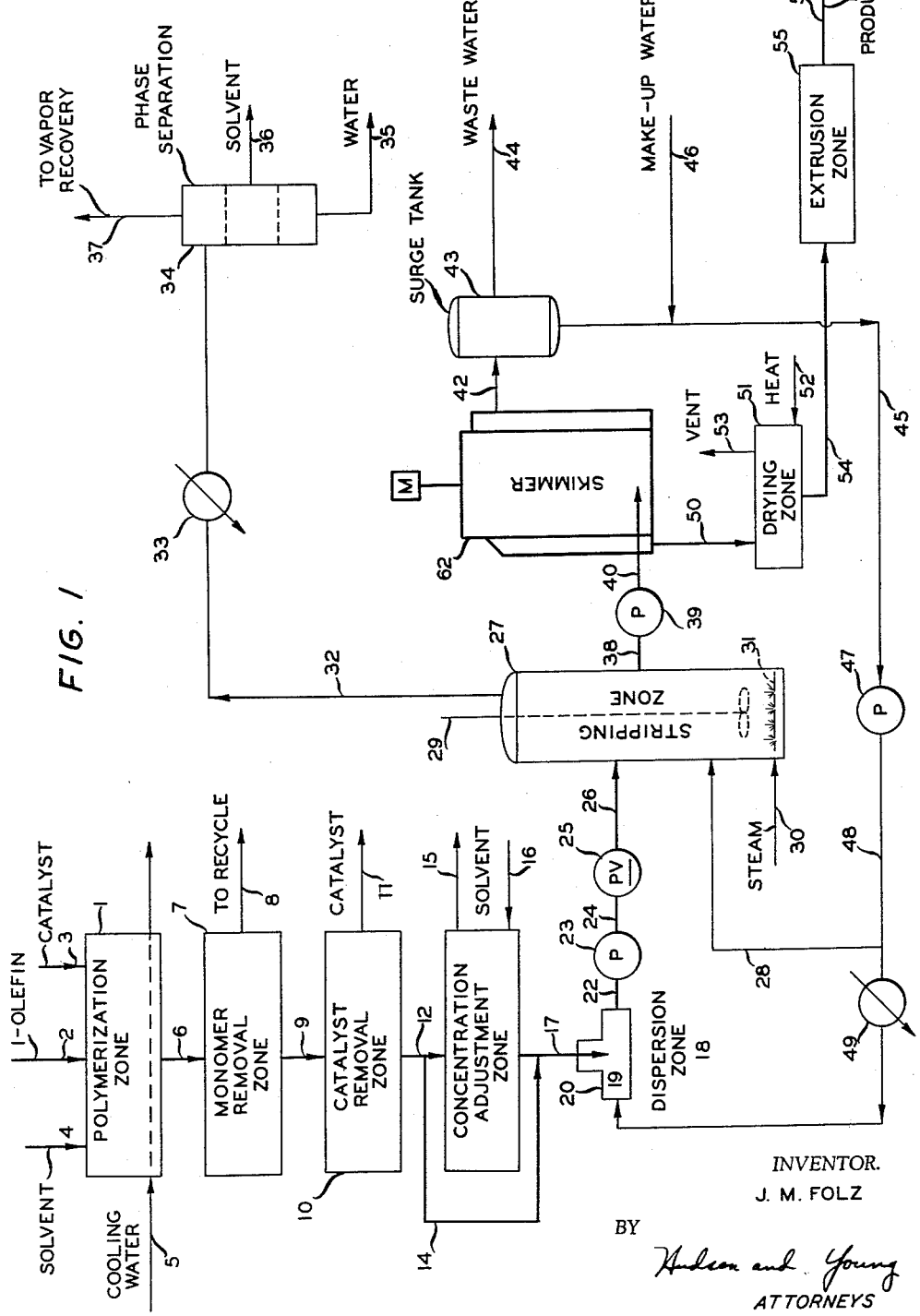

Filed Dec. 27, 1957  2 Sheets-Sheet 2

INVENTOR.
J. M. FOLZ
BY Hudson and Young
ATTORNEYS

United States Patent Office 2,929,508
Patented Mar. 22, 1960

2,929,508

POLYMER SKIMMER

John M. Folz, Bartlesville, Okla., assignor to Phillips Petroleum Company, a corporation of Delaware Application December 27, 1957, Serial No. 705,705

6 Claims. (Cl. 210—512)

This invention relates to apparatus for separating solids and liquids. In one aspect it relates to apparatus for the separation of floatable solids and liquids by centrifugal force and skimming.

As used herein the term "floatable solids" is intended to mean solids which are capable of being separated from a liquid by flotation.

In many processes in which finely divided solids are handled it becomes necessary to separate the solids from a liquid. An example is in the preparation of solid polymers, such as polymers of olefins. In certain methods of preparing solid olefin polymers the reaction product is obtained as a solution of polymer in a solvent or diluent material. Since the major uses of the polymer require a solid product, it is desirable that the polymer be separated from the solvent material, for example, by precipitation methods. In one method which is described in detail in a co-pending application of R. G. Wallace, Serial No. 584,812, filed May 14, 1956, now abandoned, a slurry of precipitated polymer in solvent is provided by spraying a solution of polymer into liquid water whereby the polymers are dispersed in the water and removed from the solution. This operation is carried out by mixing the water at a temperature between about 60° F. and about 110° F. with a polymer solution having a temperature of between about 350° F. and about 200° F., to provide a mixture of polymer, water and solvent having a temperature between about 110° F. and about 150° F. Usually the amount of water required is between 1 and about 5 lbs./lb. of polymer solution. Sufficient pressure is required during the process to maintain the solvent and water in liquid state. After the precipitation step the polymer is present in a sub-divided solid form, mixed with water and solvent. A major portion of the solvent can be removed by stripping, however; the problem still remains of separating the water whereby a dry polymer product can be obtained.

It is an object of this invention to provide improved apparatus for separating solids from a solid-liquid mixture.

Another object of this invention is to provide improved apparatus for separating floatable solids from a liquid.

Still another object of this invention is to provide improved apparatus for separating floatable solids from a liquid while transporting said solids.

Yet another object of this invention is improved apparatus for recovering solid olefin polymers from a mixture of polymer and water.

These and other objects of the invention will become more readily apparent from the following detailed description and discussion.

The foregoing objects are achieved broadly by introducing a mixture of floatable solids and liquid tangentially to a vertical cylindrical vessel, open at the top, said vessel being disposed axially within the lower portion and attached to the bottom of a larger vertically extended vessel which is adapted to contain a liquid level above the top of said cylindrical vessel. The mixture of solids and liquid leaving the open top of the smaller vessel is dispersed in the lower portion of the larger vessel, separation between the solids and liquid takes place, the water passes downwardly and out from the lower portion of the larger vessel and the solids rise to the surface of the liquid level from which they are skimmed and removed from the larger vessel. As desired the solids can be further treated for the purpose of removing residual liquid such as by drying.

The apparatus of this invention can be used in general in the treatment of solid liquid mixtures from which the separation of solids can be effected by flotation. Thus, for example, the invention can be used in oil flotation processes, in the separation of low density materials, like cork, from liquids, and in the separation of solid compounds, chemicals, etc., such as olefin polymers, from various liquids.

The invention will be described in conjunction with an olefin polymerization process and recovery system; however, this is not intended in any way to limit the scope of the invention which includes the separation of other liquids and solids as stated.

Solid olefin polymers are prepared usually by contacting the olefin to be polymerized with a catalyst at an elevated temperature and pressure, often in the presence of a solvent or diluent material. The reaction product can be one of a wide variety of olefin polymers, such as for example, polymers or copolymers of monoolefins like ethylene, propylene, butylene, etc., also copolymers of monoolefins and diolefins such as butadiene, isoprene, etc.

The temperature required for polymerizing olefins varies over a wide range. However, it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. When utilizing a fixed catalyst bed the space velocity varies from as low as about 0.1 to about 20 volumes of feed per volume of catalyst per hour, with the preferred range being between about 1 and about 6 volumes per volume per hour. The polymerization process can also be carried out in the presence of a mobile catalyst. In this type of operation the catalyst concentration in the reaction zone is maintained between about 0.01 and about 10 percent by weight and the residence time is from 10 minutes or less to 10 hours or more.

A preferred polymerization method is described in detail in a copending application of Hogan and Banks, Serial No. 573,877, filed March 26, 1956, now Patent No. 2,825,-721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymer produced by this method, particularly the polymer of ethylene, is characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity, usually greater than 90 percent at normal atmospheric temperatures.

Other less advantageous and non-equivalent procedures which employ different catalysts are also used for preparing olefin polymers. For example, polymers are prepared in the presence of organometallic compounds such as triethylaluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general, paraffins which can at least partially dissolve the polymers at the temperature employed in the reaction zone. Among the more useful solvents are paraffins having between about 3 and about 12 carbon atoms per molecule, such as for example, propane, isobutane, n-pentane, isopentane, isooctane, etc., and preferably those paraffins having 5 to 12 carbon atoms per molecule. Also useful in the polymerization reaction are alicyclic hydrocarbons having 5 to 12 carbon atoms such as cyclohexane, methylcyclohexane, etc. Aromatic diluents are also used. However in some instances they (or impurities therein) tend to shorten the catalyst life; therefore their use will depend on the importance of catalyst life. All of the foregoing, and in addition other hydrocarbon diluents, which are relatively inert and in the liquid state at the reaction conditions may also be employed in carrying out the reaction of olefins to form solid polymers.

It is apparent from the preceding discussion that the solid polymers prepared by the aforedescribed methods are present in the reaction effluent as a solution of polymer in a solvent or diluent. Inasmuch as the major uses of the polymers require a solid product, it is desirable that the polymer be separated from the solvent material. Several methods have been proposed for treating the polymer solution to accomplish this purpose. In one method, the polymer solution is sprayed into liquid water whereby the polymer is dispersed in the water and removed from solution. This process is described in detail in a copending application of R. G. Wallace, Serial No. 584,812, filed May 14, 1956 now abandoned.

As a result of the foregoing water coagulation treatment, the polymer product is obtained as a slurry of subdivided solids in a mixture of water and solvent. To obtain the desired dry product the slurry is treated first for the removal of the major portion of the solvent and then for the removal of the major portion of the water. In one method, solvent removal is effected by steam distillation following which a large proportion of the water is removed in a skimming operation.

The apparatus of this invention and the operation thereof are best described by reference to the attached drawings of which, Figure 1 is a diagrammatic illustration of an olefin polymerization process and associated recovery equipment;

Figure 3:
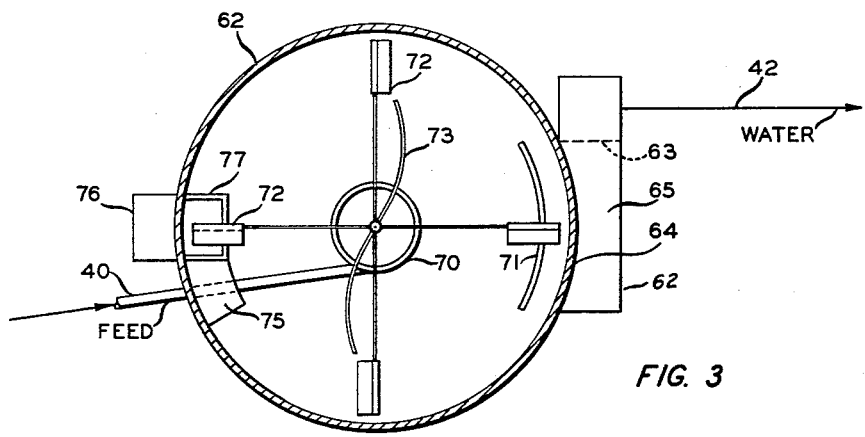
Figure 3 is a top view of the apparatus of Figure 2 taken through section 3—3.

Referring now to the drawings, a feed stream consisting essentially of the polymerizable monoolefin, ethylene for example, is passed to polymerization zone 1 via conduit 2. A chromium oxide catalyst, containing hexavalent chromium, associated with silica-alumina is introduced to said polymerization zone via conduit 3. The catalyst is usually dispersed in at least a portion of the solvent. Any additional solvent (cyclohexane) is added to polymerization zone 1 via conduit 4. The ingredients in each of these conduits 2, 3 and 4 are preferably at polymerization temperatures (230–300° F.), however, one or more streams can be cooler, with remaining streams warmer, so that the resulting dispersion is at the proper temperature. It should also be understood that the monoolefin and solvent can be premixed, if desired. The polymerization reaction is exothermic so that it is necessary to remove heat from the polymerization zone. This can be accomplished by indirect heat exchange, for example, cooling water in conduit 5. The polymerization zone effluent, at about 280° F. from zone 1 passes via conduit 6 to monomer removal zone 7 wherein unreacted ethylene is vaporized and removed via conduit 8 to ethylene recycle and any undissolved polymer is dissolved by heating, additional solvent being added as desired. The mixture passes from monomer removal zone 7 via conduit 9 to catalyst removal zone 10 wherein the solution and catalyst are separated. The catalyst is removed via conduit 11. The polymer solution is passed from separation zone 10 via conduit 14. In general, the polymer concentration in conduit 12 is low and solvent is removed from zone 13 via conduit 15. On the other hand, if the concentration is high, solvent can be added via conduit 16. The solution is cooled in this zone, either by evaporation or by cool solvent to about 240° F. The polymer concentration is adjusted to about 4.5 percent polymer in this example. In any case, the solution is passed to dispersion zone 18 wherein the polymer solution is dispersed in water of lower temperatures so as to cause polymer to precipitate under such conditions that both the water and solvent remain as liquid phases. In this embodiment, the solution passes from conduit 17 through nozzle 19 into a stream of water in pipe T 20. Nozzle 19 is positioned in said T so as to disperse the solution into the water stream. Water at about 100° F. enters T 20 via conduit 48. The resulting dispersion passes through conduit 22 to centrifugal pump 23. Dispersion by spray nozzle is preferred but other dispersion means such as colloid mill, mixing T, combination of these means, and the like can also be used. Sufficient water is admixed with the solution to provide a resulting temperature in the range of 100 to 130° F. and preferably about 120° F. The resulting dispersion passes via conduit 24 to pressure reducing valve 25 which holds the desired pressure on the dispersion zone, in this case about 35 to 45 pounds per square inch gauge. It will be understood by those skilled in the art that other pressure reducing means can be used, e.g., sufficient length of pipe, an orifice and the like. The material passes through line 26 directly to the stripping zone, which can be operated at any desired temperature and pressure so long as solvent is vaporized. Preferably, the stripper will operate at atmospheric pressure and at about 170° F., however, under vacuum, the temperature will be lower, e.g., 140° F. for 7 p.s.i.a. Since the polymer is lighter than water and will float, an agitator 29 is provided to maintain the solids in dispersion. This agitator is rotated at a speed preferably in the range of 25 to 200 r.p.m. and in this example at about 85 r.p.m. While any means of supplying heat in the stripping zone can be used, steam is especially effective. Steam from conduit 30 is supplied to the stream stripper via steam nozzle head 31.

Steam and solvent vapor pass overhead from stripping zone 27 via conduit 32 to condenser 33, where most of the vapors are condensed and then pass to separation zone 34. The solvent and water form two layers in this zone 34 and water is removed via conduit 35 while solvent is removed via conduit 36. Non-condensibles and uncondensed vapor pass overhead from zone 34 via conduit 37. The polymer residence time in this stripping zone is in the range of 20 to 30 minutes.

A mixture of polymer solids and water substantially free of solvent is removed from the stripping zone 27 through conduit 38 and pump 39 and discharged through conduit 40 to skimming tank 62. This tank comprises a first cylindrical section 66 (see Figure 2) adapted to contain a liquid level 68 in the upper portion thereof, a second adjoining section 65 which has one wall 64 common with the wall of the first section and a third section 76 which also has one wall 77 in common with the wall of the first section. The second section 65 of the skimming tank openly communicates with the first cylindrical section in the lower portion thereof and is provided in the upper portion with an outlet 42. The third section 76 openly communicates with the first section in the upper portion thereof and is provided in the lower portion with outlet conduit means 50. A cylindrical tank 70 of substantially smaller diameter and height than the first cylindrical section 66 is axially disposed in said first section and attached to the bottom thereof. The elevation of tank 70 is such that the open top of this tank is disposed substantially below liquid level 68. It is preferred that tank be sized to provide a maximum height ratio of about 3:4 and preferably between about 1:3 and about 5:8, and a diameter ratio of between about 1:12 and about 4:12 with section 66. Between tank 70 and wall 64 of section 66 is a vertical curved baffle 71 which extends from the bottom of the section 66 to above the opening between this section and section 65. A rotating skimming means provided with outer blades 72 and inner curved blade 73 is positioned in the upper portion of section 66, above the liquid level, and is suspended from shaft 77 which is driven by externally located driver 74.

Blades 72 which are L-shaped are attached in such a manner that they are free to rotate about their longitudinal axes. The blades rotate about shaft 77 pushing polymer before them. As each blade reaches inclined plane 75 it is deflected from its normal vertical position, the amount of deflection increasing as the blade travels up the inclined plane. After the blade passes over baffle 77 it returns to its normal position.

In the operation of the skimmer the polymer solids and water are introduced tangentially into the lower portion of tank 70 at a sufficient velocity so that the mixture leaving the open top of this tank follows a circular path traveling outwardly toward the inner surfaces of the first cylindrical section 66. The force imparted to the mixture is sufficient to disperse the solids throughout the liquid in the lower portion of section 66. Separation of solids and liquid takes place and the solids pass upwardly through the liquid, accumulating on the surface 68 thereof. The liquid, which is separated from the solids, passes over and around baffle 71 under wall 64 and into section 65, being withdrawn therefrom through conduit 42. It is possible that some of the smaller solids will tend to follow the liquid flow into section 65, but passage of solids in this manner is minimized by the liquid coming in contact with baffle 71. The polymer solids are skimmed from the liquid surface by blades 72 and 73, passing upwardly over inclined plane 75 and into section 76. Solids accumulating in the latter section are withdrawn through conduit 50 for further treatment, such as drying, as previously set forth.

The preceding discussion and description have been directed to a preferred embodiment of the invention; however, this is not intended in any way to limit the scope of the invention. Thus, in the preceding discussion the skimmer tank has been described as having a cylindrical shape; however, it is within the scope of the invention to use tanks of other shapes. In addition, it is within the scope of the invention to provide the liquid and solids separating section, the liquid removal section and solids removal section in a single vessel by appropriately dividing the vessel into compartments. It is also within the scope of the invention to utilize other means for removing or skimming the solid from the liquid surface.

The apparatus of this invention provides improved separation of liquids and solids, the improvement lying in the combination of a separating vessel, a smaller vessel, open at the top, axially disposed in the lower portion thereof, means for introducing to the smaller vessel a liquid solids mixture and imparting a circular path and centrifugal force to said mixture so that the solids leaving the smaller vessel are dispersed in the liquid in the lower portion of the separating vessel and separately withdrawing liquids and solids from the separating vessel.

The following example is presented in illustration of a preferred embodiment of the invention:

*Example*

Figure 2:
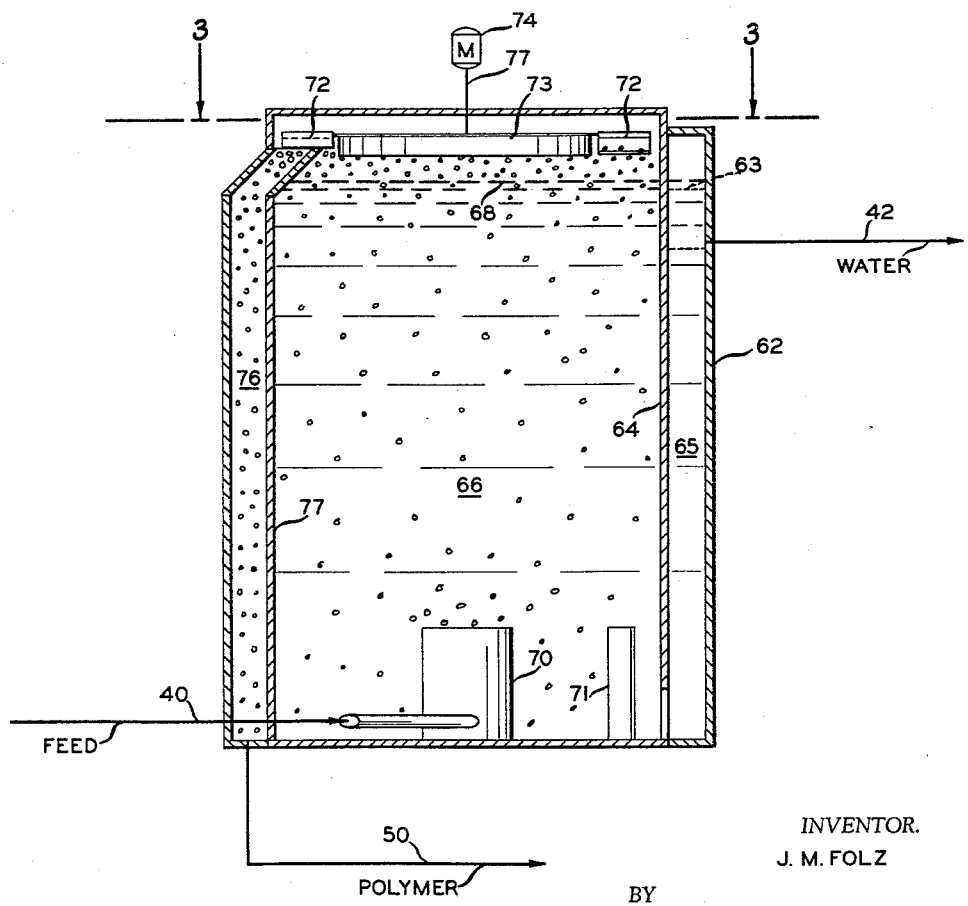
Figure 2 is a side view of the apparatus of this invention.

Tests were carried out for the recovery of solid ethylene polymer in a commercial installation similar to that illustrated in Figure 1 and in skimming apparatus as shown in Figure 2. These tests were made before and after the installation of tank 70 in the skimmer. The results obtained were as follows:

|  | Before | After |
| --- | --- | --- |
| Feed mixture, gallons/hour | 18,000 | 18,000 |
| Skimmer Temperature, °F | 175–180 | 175–180 |
| Polymer Coate nt of Feed, lb./hour | 1,000–2,000 | 1,000–2,000 |
| Polymer in Skimmel Liquid, Wt. percent | 2.0 | 0.0 |
| Water in Polymer Product, Wt. percent | 18–28 | 15–25 |

It is noted from the above data that installation of tank 70 reduced polymer loss from 2.0 weight percent, or about 10 to 20 pounds/hour to essentially zero. In addition a polymer of somewhat lower water conent was recoverd in the improved apparatus.

Having thus described the invention by providing a specific example thereof, it is to be understood that no undue limitations or restrictions are to be drawn by reason thereof and that many variations and modifications are within the scope of the invention.

I claim:

1. Apparatus, for separating flotatable solids from a liquid, comprising, in combination, a generally vertical vessel adapted to contain a liquid, a smaller generally vertical cylindrical tank open at its top and positioned within a lower portion of said vessel, said tank being sized to provide a maximum height ratio relative to said vessel of 3 to 4, means for introducing a solids containing polymer slurry to said tank substantially tangentially to the inner surface of said tank, means for maintaining a liquid level in the upper portion of said vessel, means for removing liquid from said vessel at a point below the top level of said tank, and means for withdrawing solids from the liquid surface in said vessel.

2. The apparatus of claim 1 in which a baffle is provided between said tank and the means for removing liquid from said vessel.

3. The apparatus of claim 2 in which rotating means are provided in the top portion of said vessel above the liquid level therein, adapted to move solids from the liquid surface to the solids withdrawal means.

4. Apparatus for separating flotatable solids from a liquid comprising, in combination, a generally vertical vessel adapted to contain a liquid, a smaller generally vertical cylindrical tank open at the top axially disposed below the level of the liquid in said vessel and within the lower portion of and attached to the bottom of said vessel, said tank being sized to provide a maximum height ratio relative to said vessel of 3 to 4, a first enclosed section adjoining the outer wall of said vessel and openly communicating therewith at a point below the top level of said tank, baffle means between said tank and said enclosed section adapted to deflect solids away from and prevent flow of solids into said section, a second enclosed section adjoining the outer wall of said vessel and openly communicating therewith above the liquid level therein, means for introducing a solids-containing polymer slurry to the lower portion of said tank substantially tangential to the inner surface of said tank, means for withdrawing liquid from the first enclosed section, means disposed in the upper portion of said vessel adapted to move solids from the liquid surface into the second enclosed section and means for withdrawing solids from said second section.

5. The apparatus of claim 4 in which the ratio of the diameter of said tank to the diameter of said vessel is between about 1:12 and about 4:12 and the ratio of the height of said tank to the height of said vessel is between about 1:3 and about 5:8.

6. The apparatus of claim 5 in which the means for moving solids from the liquid surface into the second enclosed section comprises a rotating means comprising a series of L-shaped blades attached by arms to a central cylindrical shaft, said blades during rotation operating to move polymers from the liquid surface up an inclined plane and into said second section.

References Cited in the file of this patent

UNITED STATES PATENTS

| | | |
|---|---|---|
| Re. 22,701 | Kelly et al. | Dec. 4, 1945 |
| 285,770 | Tucker | Sept. 25, 1883 |
| 617,057 | Sieben | Jan. 3, 1899 |
| 2,057,883 | Dehn | Oct. 20, 1936 |
| 2,539,019 | Hill | Jan. 23, 1951 |
| 2,822,928 | Wormser et al. | Feb. 11, 1958 |

FOREIGN PATENTS

| | | |
|---|---|---|
| 174,548 | Great Britain | Feb. 2, 1922 |